Mar. 6, 1923.
C. P. HAGENLOCHER.
ANTIFRICTION BEARING.
FILED NOV. 3, 1919.
1,447,844.
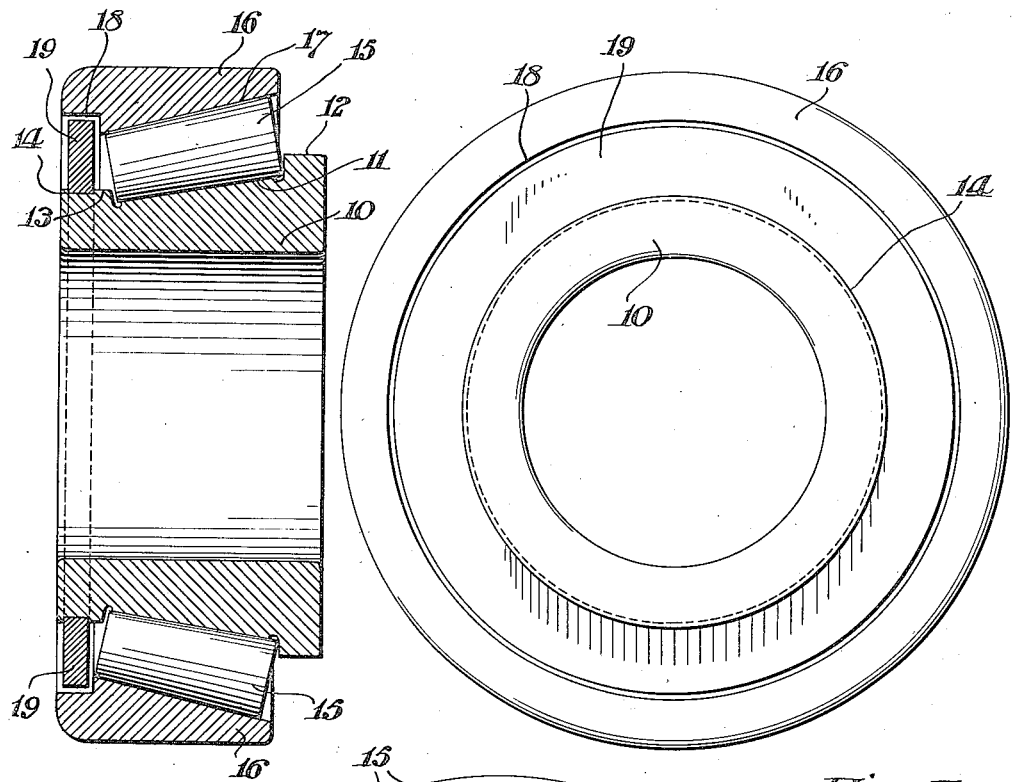
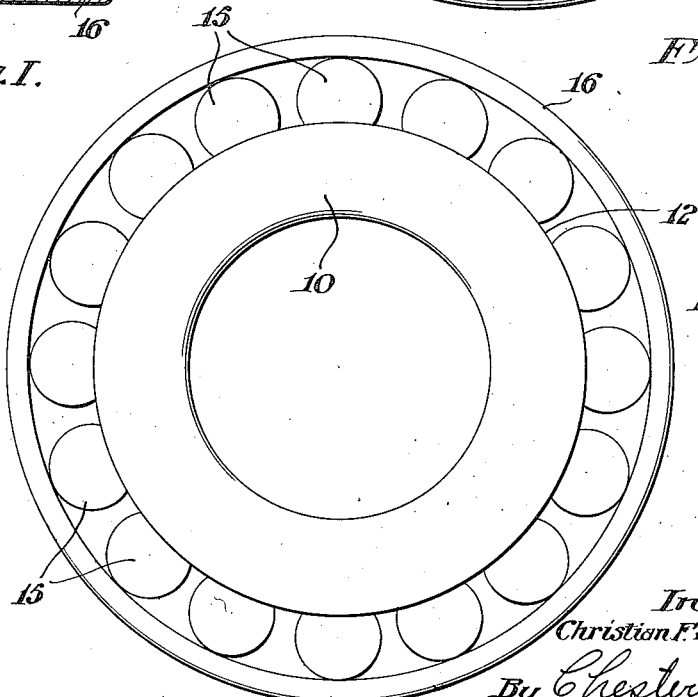
Inventor:
Christian P. Hagenlocher,
By Chester H. Braselton,
Attorney.

Patented Mar. 6, 1923.

1,447,844

UNITED STATES PATENT OFFICE.

CHRISTIAN P. HAGENLOCHER, OF PHILADELPHIA, PENNSYLVANIA, ASSIGNOR TO WRIGHT ROLLER BEARING COMPANY, OF PHILADELPHIA, PENNSYLVANIA, A CORPORATION OF DELAWARE.

ANTIFRICTION BEARING.

Application filed November 3, 1919. Serial No. 335,421.

*To all whom it may concern:*

Be it known that I, CHRISTIAN P. HAGENLOCHER, residing at Philadelphia, county of Philadelphia, State of Pennsylvania, have invented certain new and useful Improvements in Antifriction Bearings, of which I declare the following to be a full, clear, and exact description.

This invention relates to improvements in anti-friction bearings, and relates more particularly to improvements in bearings of the tapered roller type.

One of the chief objects of my invention is to provide a unitary self-contained tapered roller bearing, the parts of which cannot be separated readily when they have once been assembled together.

Another object of my invention is to provide an anti-friction bearing in which the number of parts is reduced and the bearing is so simplified that a considerable saving in material, and in the labor needed to form the parts, is effected.

Further objects, and objects relating to economies of operation and production and details of construction, will definitely appear from the detailed description to follow. I accomplish the objects of my invention by the devices and means described in the following specification. My invention is clearly defined and pointed out in the appended claims. A structure, which may be a preferred embodiment of my invention, is illustrated in the accompanying drawing, forming a part of this specification, in which:—

Figure I is a vertical, sectional view through a bearing embodying my invention.

Figure II is an end view of the bearing looking at the left hand end in Figure I, and Figure III is an end view of the bearing looking at the right hand end in Figure I.

In the drawing, similar reference numerals refer to similar parts throughout the several views.

Considering the numbered parts of the drawings, I have shown a bearing comprising an inner bearing member or cone 10, having an externally tapered conical bearing surface 11, and annular thrust shoulders, 12 and 13, at the margins of said bearing surface 11. An annular groove 14 is formed in the thrust shoulder 13 adjacent the small-diameter end of the conical bearing surface 11.

An outer bearing member or cup 16, has an internal conical bearing surface 17, and a plurality of tapered rollers, 15, are interposed between and roll upon the bearing surfaces 11 and 17. The outer bearing member 16 is counter-bored, adjacent the small diameter end of the conical bearing surface 17, to form the annular seat 18. A ring 19 is seated in the groove 14, being shrunk therein, and the periphery of said ring 19 extends into the seat 18 and overlaps the end of the cup 16, without touching, however, the cup member.

The outer and inner bearing members and the rollers are assembled in the usual manner, and the ring 19 is then shrunk into place. This holds the parts in assembled position without interfering with the relative rotation of the bearing rings. Any movement of the bearing members relative to each other, in one direction, is prevented by the taper of the bearing surfaces and of the rollers, and any relative movement in the opposite direction is prevented by the ring 19, which overlaps the end of the cup 16 adjacent the small-diameter end of the bearing surface 17.

The bearing operates in the usual manner, but no retaining rings are necessary because the inner and outer bearing members are always held assembled together and hold the rollers in place. This results in a considerable saving in material and labor and permits the simplification of the rollers and bearing members with a consequent saving in material and labor.

I am aware that the particular embodiment of my invention, which I have shown and described here, is susceptible of considerable variation without departing from the spirit thereof, and, therefore, I desire to claim the same broadly, as well as specifically, as indicated by the appended claims.

Having thus described my invention, what I claim as new and desire to secure by Letters Patent, is:

1. An anti-friction bearing comprising the combination of an inner bearing member, having an external conical bearing surface, an outer bearing member having an internal conical bearing surface, a plurality of rollers interposed between and rolling on said surfaces, and a ring shrunk on one end of one bearing member and overlapping the adjacent end of the other bearing member in a manner to hold said bearing members in assembled relation.

2. An anti-friction bearing comprising the combination of an inner bearing member, having an external conical bearing surface, an outer bearing member having an internal conical bearing surface, a plurality of rollers interposed between and rolling on said surfaces, and means for holding said bearing members in assembled relation, secured to the small-diameter end of one bearing member and overlapping the adjacent end of the other bearing member.

3. An anti-friction bearing comprising the combination of an inner bearing member, having an external conical bearing surface, an outer bearing member having an internal conical bearing surface, a plurality of rollers interposed between and rolling on said surfaces, and a ring secured on the small-diameter end of one bearing member and overlapping the adjacent end of the other bearing member.

4. An anti-friction bearing comprising the combination of an inner bearing member, having an external conical bearing surface, an outer bearing member having an internal conical bearing surface, a plurality of rollers interposed between and rolling on said surfaces, and a ring shrunk on the small-diameter end of one bearing member and projecting into an annular recess formed on the adjacent end of the other bearing member.

In testimony whereof, I affix my signature.

CHRISTIAN P. HAGENLOCHER.